(12) United States Patent
Jønsson et al.

(10) Patent No.: US 7,023,576 B1
(45) Date of Patent: Apr. 4, 2006

(54) METHOD AND AN APPARATUS FOR ELIMINATION OF COLOR MOIRÉ

(75) Inventors: Michael Jønsson, Vallensbaek (DK); Casper Find Andersen, Gentofte (DK); Niels V. Knudsen, Hellerup (DK)

(73) Assignee: Phase One A/S, Frederiksberg (DK)

( * ) Notice: Subject to any disclaimer, the term of this patent is extended or adjusted under 35 U.S.C. 154(b) by 0 days.

(21) Appl. No.: 09/567,278

(22) Filed: May 9, 2000

(51) Int. Cl.
*G06F 15/00* (2006.01)
*H04N 1/46* (2006.01)
*G06K 9/00* (2006.01)

(52) U.S. Cl. .................. 358/1.9; 358/533; 382/167

(58) Field of Classification Search ............... 382/169, 382/176, 203, 252, 262, 167, 164, 261, 300, 382/282, 254, 264, 305; 358/3.07, 1.9, 518, 358/520, 525, 533, 535; 348/578; 375/240.03; 345/592; 708/490
See application file for complete search history.

(56) References Cited

U.S. PATENT DOCUMENTS

| | | | |
|---|---|---|---|
| 4,607,287 A | 8/1986 | Endo et al. | |
| 4,642,678 A | 2/1987 | Cok | |
| 4,652,928 A | 3/1987 | Endo et al. | |
| 4,894,726 A | 1/1990 | Steinhardt et al. | |
| 4,979,136 A * | 12/1990 | Weiman et al. | 382/169 |
| 4,998,164 A | 3/1991 | Endo et al. | |
| 5,063,448 A * | 11/1991 | Jaffray et al. | 348/578 |
| 5,063,450 A | 11/1991 | Pritchard | |
| 5,237,446 A | 8/1993 | Takahashi | |
| 5,287,419 A * | 2/1994 | Sato et al. | 382/252 |
| 5,295,204 A * | 3/1994 | Parulski | 382/167 |
| 5,299,028 A * | 3/1994 | Kwarta | 358/445 |
| 5,303,069 A * | 4/1994 | Speciner | 358/3.1 |
| 5,347,599 A | 9/1994 | Yamashita et al. | |
| 5,373,322 A | 12/1994 | Laroche et al. | |
| 5,481,628 A * | 1/1996 | Ghaderi | 382/261 |
| 5,486,927 A * | 1/1996 | Koizumi et al. | 358/3.07 |
| 5,506,619 A | 4/1996 | Adams, Jr. et al. | |
| 5,510,835 A | 4/1996 | Nishizawa et al. | |
| 5,552,825 A | 9/1996 | Talluri et al. | |
| 5,552,827 A | 9/1996 | Maenaka et al. | |
| 5,612,908 A * | 3/1997 | Pechanek et al. | 708/490 |
| 5,614,947 A | 3/1997 | Tanizoe et al. | |
| 5,652,621 A | 7/1997 | Adams et al. | |
| 5,682,443 A * | 10/1997 | Gouch et al. | 382/254 |
| 5,798,846 A * | 8/1998 | Tretter | 382/262 |
| 5,838,840 A * | 11/1998 | King et al. | 382/300 |
| 5,852,678 A * | 12/1998 | Shiau et al. | 382/176 |
| 5,877,806 A | 3/1999 | Kawano | |
| 5,877,807 A | 3/1999 | Lenz | |
| 5,915,047 A | 6/1999 | Muramoto | |

(Continued)

FOREIGN PATENT DOCUMENTS

EP  0 393 598 B1  10/1990

(Continued)

*Primary Examiner*—Madeleine Nguyen
(74) *Attorney, Agent, or Firm*—Volentine Francos & Whitt, PLLC

(57) ABSTRACT

A digital image processing method for eliminating Moiré in a digital image divided into pixels holding pixel component values includes selecting a first pixel and defining a pixel window around the selected first pixel. Then, a set of pixels are identified which consist of pixels within the window that have pixel component values within a pixel component value range that is related to the selected first pixel. A pixel component value is calculated based on corresponding pixel component values of pixels in the set of pixels and then this calculated pixel component value is allocated to the selected first pixel.

30 Claims, 5 Drawing Sheets

U.S. PATENT DOCUMENTS

| | | | | |
|---|---|---|---|---|
| 5,969,619 A | * | 10/1999 | Niemiro et al. | 340/618 |
| 5,969,757 A | | 10/1999 | Okada et al. | |
| 5,978,519 A | * | 11/1999 | Bollman et al. | 382/282 |
| 6,040,569 A | | 3/2000 | Hynecek | |
| 6,108,455 A | * | 8/2000 | Mancuso | 382/261 |
| 6,151,030 A | * | 11/2000 | DeLeeuw et al. | 345/592 |
| 6,173,075 B1 | * | 1/2001 | Collins | 382/203 |
| 6,181,834 B1 | * | 1/2001 | Li et al. | 382/298 |
| 6,356,588 B1 | * | 3/2002 | Otto | 375/240.03 |
| 6,363,177 B1 | * | 3/2002 | Loce et al. | 382/254 |
| 6,408,109 B1 | | 6/2002 | Silver et al. | |
| 6,427,031 B1 | * | 7/2002 | Price | 382/264 |
| 6,493,029 B1 | | 12/2002 | Denyar et al. | |
| 6,535,652 B1 | * | 3/2003 | Nakatsuka | 382/305 |
| 6,587,148 B1 | | 7/2003 | Takeda et al. | |
| 6,625,331 B1 | * | 9/2003 | Imaizumi et al. | 382/294 |
| 6,631,206 B1 | * | 10/2003 | Cheng et al. | 382/164 |
| 2001/0043755 A1 | * | 11/2001 | Edgar | |
| 2003/0002747 A1 | * | 1/2003 | Zaklika et al. | |

FOREIGN PATENT DOCUMENTS

| | | |
|---|---|---|
| EP | 0 393 663 A2 | 4/1995 |
| EP | 0 632 663 A2 | 4/1995 |
| JP | 02001119596 A * | 4/2001 |
| WO | WO 97 35438 A | 9/1997 |
| WO | WO 97 48231 A | 12/1997 |
| WO | WO 99/04555 | 1/1999 |

* cited by examiner

| R | G | R | G | R | G | R | G | R |
|---|---|---|---|---|---|---|---|---|
| G | B | G | B | G | B | G | B | G |
| R | G | R | G | R | G | R | G | R |
| G | B | G | B | G | B | G | B | G |
| R | G | R | G | R | G | R | G | R |
| G | B | G | B | G | B | G | B | G |
| R | G | R | G | R | G | R | G | R |
| G | B | G | B | G | B | G | B | G |
| R | G | R | G | R | G | R | G | R |
Fig. 1
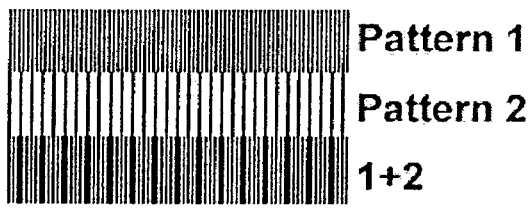
Fig. 2
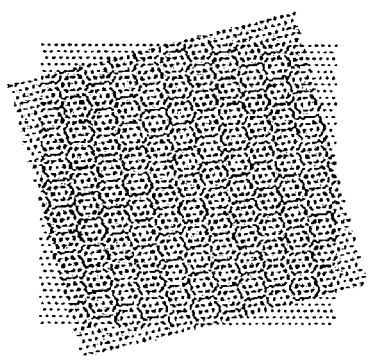
Fig. 3

Set of pixels #1

```
R  G  R  G │R│ G  R  G  R
G  B  G  B │G│ B  G  B  G
R  G  R  G │R│ G  R  G  R
G  B  G  B │G│ B  G  B  G
R  G  R  G │R│ G  R  G  R
G  B  G  B │G│ B  G  B  G
R  G  R  G  R  G  R  G  R
G  B  G  B  G  B  G  B  G
R  G  R  G  R  G  R  G  R
G  B  G  B  G  B  G  B  G
```

Set of pixels #2

```
R  G  R  G  R  G  R  G  R
G  B  G  B  G  B  G  B  G
R  G  R  G  R  G  R  G  R
G  B  G  B  G  B  G  B  G
R  G  R │G  R  G  R  G  R│
G  B  G  B  G  B  G  B  G
R  G  R  G  R  G  R  G  R
G  B  G  B  G  B  G  B  G
R  G  R  G  R  G  R  G  R
```

Set of pixels #3

```
R  G  R  G  R  G  R  G  R
G  B  G  B  G  B  G  B  G
R  G  R  G  R  G  R  G  R
G  B  G  B │G│ B  G  B  G
R  G  R  G │R│ G  R  G  R
G  B  G  B │G│ B  G  B  G
R  G  R  G │R│ G  R  G  R
G  B  G  B │G│ B  G  B  G
R  G  R  G │R│ G  R  G  R
```

Set of pixels #4

Original color image
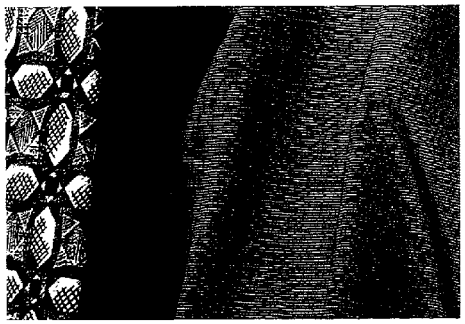
Image after color moire suppression
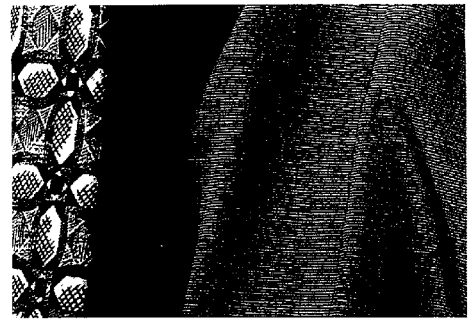
Original red channel
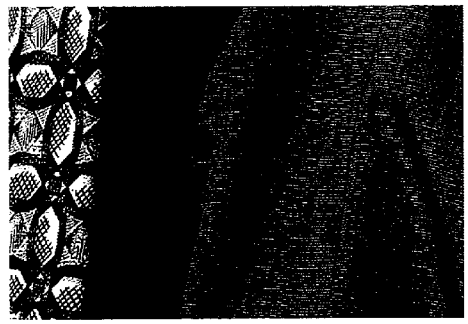
Red channel after color moire suppression
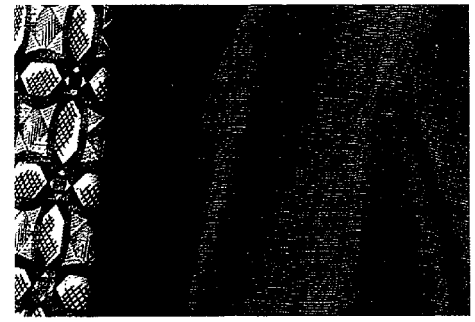
Original green channel
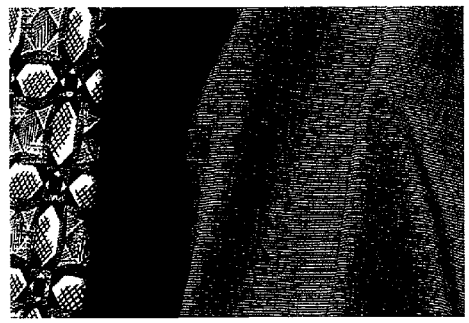
Green channel after color moire suppression
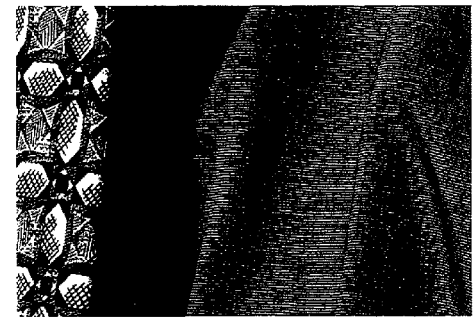
Original blue channel
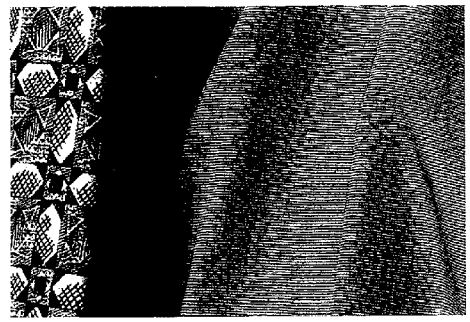
Blue channel after color moire suppression
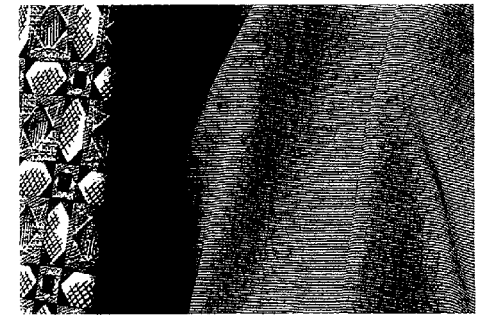
Fig. 5

| -1 | -1 | -1 |
|---|---|---|
| 2 | 2 | 2 |
| -1 | -1 | -1 |

| -1 | -1 | 2 |
|---|---|---|
| -1 | 2 | -1 |
| 2 | -1 | -1 |

| -1 | 2 | -1 |
|---|---|---|
| -1 | 2 | -1 |
| -1 | 2 | -1 |

| 2 | -1 | -1 |
|---|---|---|
| -1 | 2 | -1 |
| -1 | -1 | 2 |

Fig. 7

METHOD AND AN APPARATUS FOR ELIMINATION OF COLOR MOIRÉ

FIELD OF THE INVENTION

The present invention relates to digital image processing and in particular to digital image processing for elimination of color Moiré.

BACKGROUND OF THE INVENTION

It is well known to represent an image digitally by dividing the image into a large number of segments or resolution elements, denoted pixels, and allocating digital values, denoted pixel values, to each pixel. Typically, the image is divided into a matrix of rows and columns of pixels and the pixel values are typically stored in an array in a digital memory.

For example, a grey tone image may be represented digitally by a digital image comprising pixels each of which has one pixel value representing the grey tone of the corresponding pixel. Similarly, a color image may be represented by a digital image comprising pixels each of which holds three pixel component values, e.g. a value for each of the colors red, green, and blue.

An image recording system, such as an electronic camera, a digital camera, an electronic scanner, a digital scanner, uses a solid state imaging device, typically a charge coupled device (CCD), for recording of an image.

The CCD is an array of a large number of light sensitive elements connected to each other forming an analogue shift register. In each detector of the CCD, a charge is formed that is proportional to the light energy incident on the detector during an integration period. After completion of the integration period, the analogue charge of each detector is shifted serially out of the CCD and is converted to a digital value whereby a digital representation of the recorded image is formed. Each pixel value of the digital image is equal to the digitized charge of the corresponding CCD element. The pixel values may be transferred to an external computer through a computer interface or may be stored in a memory, such as a memory card, or on a rotating magnetic recording medium, in the apparatus containing the CCD.

In the following, the term pixel may refer to the smallest graphical resolution element of an image as reproduced on a viewable medium, e.g. a computer screen, paper, etc, or a storage location in a memory holding the corresponding pixel component values, or a sensor element in a sensor array. The actual meaning of the term pixel will be apparent from the context in which it appears.

In order to record a color image in a single exposure, a two-dimensional CCD array with rows and columns of CCD elements is typically overlaid by a color filter mosaic, such as a RGB filter mosaic, a CMY filter mosaic, etc, whereby each light sensitive CCD element (pixel) in the CCD-array is covered with a filter that allows passage of light within a specific wavelength range corresponding to a specific color. Since each pixel is illuminated by one specific color, resolution of the recorded color image is lower than the original grey tone resolution of the CCD array since each image pixel corresponds to a plurality of CCD elements. Thus, a color filter mosaic allows a color image to be recorded in a single exposure at the expense of resolution.

It is well known in the art to improve spatial resolution of a color image by estimation of a color that is not recorded by a specific CCD element by interpolation. Numerous interpolation algorithms and interpolation strategies are known in the art. For example, U.S. Pat. No. 5,373,233 discloses a color interpolation method.

It is well known that digital images of objects having some repetitive regular structures may be distorted by Moiré effects.

The Moiré effect is created by interference between two or more regular structures, e.g. with different spatial frequencies as shown in FIG. 2. Two linear patterns 1, 2 with different spatial frequencies are shown generating frequency beating. Likewise, a Moiré effect may be generated when two patterns are rotated or displaced with respect to each other as shown in FIG. 3. Similarly, colored patterns may create colored Moiré patterns which is termed color Moiré throughout the present disclosure.

When recording images using an image recording system that images an object onto a two-dimensional CCD array, a first pattern is inherent in the recording system namely the pattern constituted by the matrix of CCD elements. Therefore, the recording of a digital image of any object having some repetitive structure may produce an image with Moiré patterns.

Various methods for reducing Moiré effects are known:

1. Using a quasi-periodic patterned CCD, in which the CCD elements do not form a regular matrix. Instead they form an irregular pattern of elements with varying distances between them. The irregular matrix has no definite spatial frequency, and hence interference with a spatial frequency in the image is prevented (U.S. Pat. No. 4,894,726).

2. Optical blurring for distorting an object pattern in the formed image, e.g. by inserting an anti-aliasing filter in front of the image.

The idea of aggravating image resolution in order to corrupt the spatial frequency producing Moiré effects is also utilized in the next two methods.

3. Optical low-pass filters may cause different colors of incident light to propagate along different paths. Thereby any patterning in the formed image are "color-separated", hence the color resolution is reduced thereby reducing Moiré effects (U.S. Pat. No. 5,237,446).

4. By optical methods disclosed in U.S. Pat. No. 4,607,287 or U.S. Pat. No. 4,998,164, the spatial frequency of the recording device is corrupted by swinging or wobbling the CCD array.

It is a disadvantage of method 2, 3 and 4 for suppression of Moiré effects that the recorded image resolution or sharpness is decreased.

It is a further disadvantage of method 2 and 3 that an extra optical element is inserted in the beam path to corrupt or filter the spatial frequency in the image causing increased complexity and cost and also attenuation of recorded light intensity.

It is a disadvantage of method 1 that cost expensive non-standard CCD arrays comprising irregular shaped sensor elements are required.

It is a disadvantage of method 4 that the displacement is one-dimensional so that only one of the two spatial frequencies of the CCD array are efficiently removed.

SUMMARY OF THE INVENTION

It is an object of the present invention to provide an image processing method and system for reduction of color Moiré that are simple and efficient.

According to a first aspect of the invention, the above and other objects are fulfilled by a digital image processing method of eliminating Moiré in a digital image divided into pixels holding pixel component values, comprising the steps of Selecting a pixel, Defining a pixel window around the selected first pixel, Identifying a set of pixels consisting of pixels within the window that have pixel component values within a pixel component value range that is related to the selected first pixel, Calculating a pixel component value based on corresponding pixel component values of pixels in the set of pixels, and Allocating the calculated pixel component value to the selected first pixel.

According to a second aspect of the invention, an image processing apparatus is provided having a processor that is adapted to perform the method according to the invention.

According to a third aspect of the invention, an image recording system with a processor that is adapted for performing a method according to the invention is provided.

According to a fourth aspect of the invention, a software program for performing a method according to the invention is provided.

According to a fifth aspect of the invention, a data carrier with software for performing a method according to the invention is provided.

Typically, a digital image is created by transmission of light towards an object and detection by an electronic camera of light reflected from or transmitted through the object. However, in general a digital image may be created by transmission of any kind of radiated energy, such as electromagnetic radiation, such as visible light, infrared radiation, ultraviolet radiation, X-rays, radio waves, etc, ultrasound energy, particle energy, such as electrons, neutrons, etc, etc, towards an object for interaction with the object and by detection of energy having interacted with the object, such as by reflection, refraction, absorption, etc.

A digital image may be formed by any imaging system, such as radiometer systems, infrared systems, radar systems, ultrasound systems, X-ray systems, electronic cameras, digital scanners, etc, adapted to detect the kind of energy in question and to generate a digital image based on the energy detection.

An image recording system operating with light, such as an electronic still camera, a video camera, an electronic scanner, a digital scanner, uses a solid state imaging device; such as a charge coupled device (CCD), a Bulk Charge Modulated Device (BCMD), etc, for recording of an image.

A pixel component may correspond to any selected part of energy detected by the imaging system that recorded the image, such as a specific wavelength interval of the electromagnetic spectrum, such as a spectral range corresponding to a specific color, such as red, green, blue, etc, an interval in the ultraviolet range, the infrared range, the X-ray range, etc, a selected particle, a specific ultrasound frequency range, etc.

Further, a pixel component may also correspond to a variable in any color space to which a recorded source image has been transformed such as the CIE 1976 L*a*b* color space, the CIE 1976 L*u*v* color space, the CIELCH (L*C*h°) color space, etc.

As already mentioned, it is well known in the art to estimate a color that is not recorded by a specific CCD element by interpolation. Numerous interpolation algorithms and interpolation strategies are known in the art. For example, U.S. Pat. No. 5,373,233 discloses a color interpolation method. Any known interpolation method may be utilized for interpolation of pixel component values that have not been recorded followed by removal of color Moiré utilizing the above-mentioned method. Alternatively, the above-mentioned method may be applied to an image with pixels with missing pixel component values. Then a missing pixel component value will be calculated according to any appropriate interpolation method when it is required for performing a specific step of the above-mentioned method.

However, it is preferred to calculate missing component values by interpolation according to an image processing method comprising the steps of interpolating a color (A) value of a selected second pixel by calculating the color (A) value from color values of a selected set of pixels that are positioned adjacent to the selected second pixel, the influence of at least one pixel abutting the selected second pixel being significantly reduced whereby blurring of distinct features of the image is substantially avoided.

By adjacent is meant that the selected set of pixels should be near the selected second pixel. Influence of a pixel is said to be significantly reduced when it is excluded from the selected set of pixels or when the component value is multiplied by a small weight factor in the interpolation.

The interpolation method further comprises the steps of (a) forming a first set of pixels that are positioned adjacent to the selected second pixel, and calculating a first variation value of color values of the pixels of the first set, (b) forming a second set of pixels that are positioned adjacent to the selected second pixel, and calculating a second variation value of color values of the pixels of the second set, (c) comparing the first and second variation values, and calculating the color (A) value from color values of the set of pixels with the lowest variation value.

The image processing method may further include a step, wherein color (B) values of the set of pixels with the lowest variation value are included in the calculation of the color (A) value. In particular the color (B) values are included in the calculation of variation values of the first and second set of pixels, respectively.

Further, each of the steps of calculating variation values of the first and second set of pixels, respectively, may comprise (a) calculating the ratio between color (A) values and color (B) values of abutting pixels of the respective set of pixels, (b) calculating a mean value of the calculated ratio values, and (c) calculating the variation value of the respective set of pixels as the sum of the absolute value of the difference between each of the ratios and the mean value.

The step of calculating the color (A) value may comprise (a) calculating a weighted sum of color (B) values of the set of pixels with the lowest variation value, (b) calculating a weighted sum of color (A) values of the set of pixels with the lowest variation value, and (c) calculating the color (A) value by multiplying the color (B) value of the selected second pixel with the ratio between the weighted sums of color (A) and color (B) values:

Further, the color (A) value may be calculated from an arbitrary number of color values.

The selected set of pixels may take any form and may comprise an arbitrary number of pixels.

In particular, the selected sets of pixels may be arranged in rows and columns parallel to the rows and columns of the pixels in the image matrix. Alternatively the selected sets of pixels may be arranged in rows at an angle of approximately 45 degree relative to the rows and columns of pixels in the image.

In another alternative the selected sets of pixels may be arranged in rows and columns parallel to the rows and columns of the pixels in the image matrix and at an angle of approximately 45 degree relative to the rows and columns of pixels in the image.

The selected set of pixels may also be arranged at an arbitrary angle relative to the rows and columns of the pixels in the image.

The number of selected sets of pixels may be arbitrary. Preferably the number of selected sets of pixels is larger than 2, such as 4.

It is an advantage of the above-mentioned interpolation approach that the method and system significantly improves the ability to estimate the missing luminance information in a digitized image. A correct estimation of the missing luminance information is vital for the impression of sharpness and detail richness.

It is further advantage of the interpolation approach that all chrominance information is preserved to give images the highest degree of color fidelity while avoiding all of the well known aliasing.

It is a still further advantage of the interpolation approach that the relative low complexity of the method makes it easy to implement the approach in both software and/or hardware based applications. The method is also applicable in other areas of imaging such as image scaling, image compression and visual enhancements such as unsharp masking and noise reduction.

In the following the invention will be described with reference to the accompanying figures.

BRIEF DESCRIPTION OF THE DRAWINGS

FIG. 1 shows a CCD array with a preferred color filter mosaic of the type Bayer 2G, FIG. 2 shows a pattern 1 and a pattern 2, which are superimposed to give a pattern 1+2 exhibiting Moiré effects, FIG. 3 shows, in analogy with FIG. 2, two patterns, which are superimposed to show Moiré effects.

FIG. 4 shows an illustration of four selected set of pixels,

FIG. 5 shows a color image with color Moiré patterns that has been processed by a method according to the present invention, FIG. 7 illustrates filter matrices that are centered around a selected pixel for calculation of filter output values of the green pixel component.

DETAILED DESCRIPTION OF A PREFERRED EMBODIMENT

Figure 6:
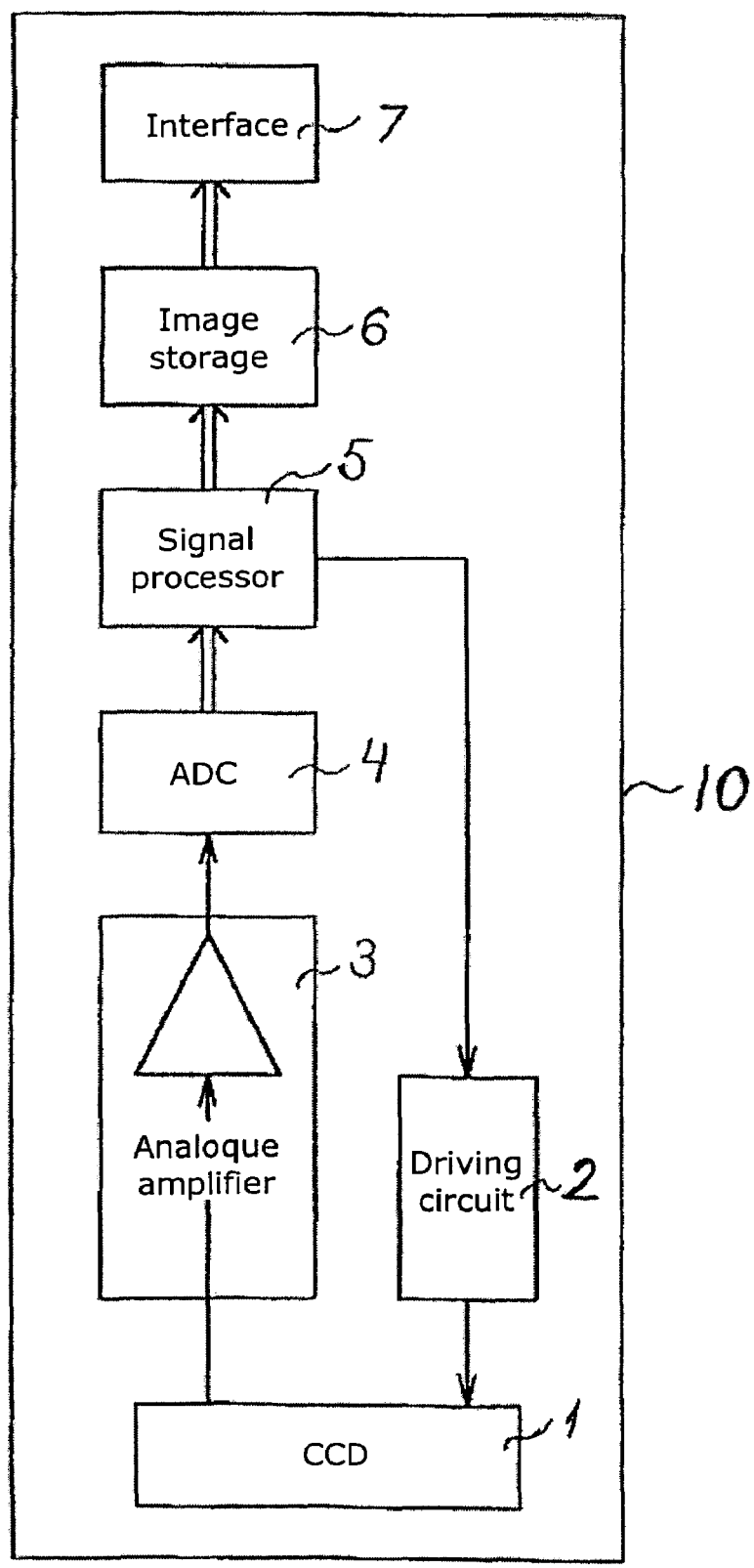
FIG. 6 is a diagram schematically showing the construction of an electronic camera according to the present invention for recording and processing of digital images.

FIG. 1 shows a CCD array with a preferred color filter mosaic. The filter mosaic is of the type Bayer 2G. Each cell in the array represents a pixel on the m×n array CCD where m is the number of CCD columns and n is the number of CCD rows. R designates filters ("red filters") which are selectively transparent to the red region of the spectrum, G designates filters ("green filters") which are selectively transparent to the green region of the spectrum and B designates-filters ("blue filters") which are selectively transparent to the blue region of the spectrum. It is seen that the filters are distributed according to type (color) in repeating interlaid patterns, the green filters occurring most frequently whereby green is sampled with the highest spatial resolution across the image. This conforms to the human visual system's relatively greater ability to resolve details in the green spectral region. It is also seen that blue and red filters alternate with the green filters in respective alternate rows of the array so that the image is sampled uniformly for all three colors in two orthogonal directions. Thus, upon image recording, every second pixel contains a green pixel value, i.e. an intensity value of light transmitted through a green filter, and correspondingly every fourth pixel contains a blue and a red pixel value, respectively.

Utilization of mosaic filters where different colors are sampled with different spatial frequencies may create color Moiré due to aliasing. The present invention provides a method for elimination of such color Moiré.

The invention is based on the observation that within a specific area of the image, e.g. an area corresponding to a part of an object with substantially uniform optical properties, e.g. a shirt worn by a person, there is a close correlation between intensities of different colors, e.g. red, green and blue. According to the present invention, this knowledge is utilized to adjust pixel component values of pixel components that are sampled with a low spatial frequency. The adjustment is based on pixel component values of a pixel component that is sampled with a high spatial frequency.

For example, in the filter mosaic of FIG. 1, the green component is sampled with the highest spatial frequency. In a first step of the method according to a first embodiment of the invention, missing red, green and blue pixel component values are calculated by interpolation. Numerous interpolation methods are known in the art and any known interpolation method may be utilized for interpolation of pixel component values. In the following the output pixel component values of the first step are denoted originally recorded and interpolated pixel component values.

An interpolation strategy and an interpolation algorithm according to a preferred embodiment of the present invention is further described below.

Then for a selected pixel, a red and a blue pixel value are calculated based on the green pixel value (since the green component is sampled with the highest spatial frequency) by 1) defining a window around the selected first pixel. For example, the window is a rectangle of pixels centered around the selected first pixel, or the window is a square of pixels centered around the selected first pixel, e.g. a square of 63 by 63 pixels, 2) defining a pixel criterion relating to the selected first pixel, for example that green pixel values should lie within a certain numerical range, e.g. centered around the green pixel value of the selected first pixel, and 3) for the pixels within the defined area that fulfill the criterion, calculating a weighted average, e.g. the average, of the blue and the red pixel values, respectively, and allocating the calculated values to the selected first pixel.

For example, when the position of the selected first pixel in the image is denoted $(x_0, y_0)$ and a square window of 63 by 63 pixels is defined around this pixel, the window is constituted by pixels having position coordinates $(u,v)$ fulfilling the equations:

$$x_0 - d \leq u \leq x_0 + d$$

$$y_0 - d \leq v \leq y_0 + d$$

d is the distance between the selected pixel $(x_0, y_0)$ and the sides of the square, i.e. $d=31$ in the present example.

The criterion to be fulfilled is given by:

$$g(x_0,y_0)-\Delta \leq g(u,v) \leq g(x_0,y_0)+\Delta \cong 2$$

In the present example, g is a 16 bit number representing the green pixel value. Thus, if the green pixel value of the selected first pixel is 50, the criterion defines that green pixel values should have a value between 48 and 52, endpoints included. All pixels within the window fulfilling this criterion are identified. Then, an average of the red and blue pixel values, respectively of the identified pixels are calculated and allocated as red and blue pixel values, respectively, of the selected first pixel:

$$r(x_0, y_0) = \frac{1}{N(x_0, y_0, d)+1} \sum_{i=0}^{N(x_0,y_0,d)} r(x_i, y_i)$$

$$b(x_0, y_0) = \frac{1}{N(x_0, y_0, d)+1} \sum_{i=0}^{N(x_0,y_0,d)} b(x_i, y_i)$$

Wherein $(x_i,y_i)$ are coordinates of pixels fulfilling the above-mentioned criterion, $N(x_0,y_0,d)$ is the number of pixels fulfilling the criterion.

The method may be applied to all pixels in the digital image, or, it may be applied to pixels within a selected area of the image. The selected area may be selected manually according to methods well-known in the art, e.g. by displaying the image on a computer screen and drawing a boarder line between the selected area and the remaining part of the image with a cursor and a mouse. Alternatively, the area may be selected semi-automatically according to methods well-known in the art, e.g. by displaying the image on a computer screen, e.g. specifying a color range of the area to be selected.

The method according to the invention may also be applied to pixels within image areas that are automatically selected, e.g. based on spatial features of the image. For example, a spatial frequency analysis may be performed on the image, and areas of the image that contain spatial frequencies above a predetermined threshold may be automatically selected. Successively, the method according to the invention is applied to every pixel of the selected areas of the image.

Naturally, for selected first pixels close to an edge of the selected area, the window around the selected first pixel will not be centered around the selected first pixel.

The size, i.e. the number of pixels of the window defined around the selected first pixel, may be adjusted in accordance with calculated parameters, such as spatial frequency content, etc, of the window or the selected area.

The modified pixel values may be validated according to the following steps:

For each pixel of the set of pixels, the filter matrices of FIG. 7 are centered around the pixel and corresponding filter output values are calculated for the green pixel component and the variance of the four values is calculated. A flag is set to one when the variance is less than a threshold value, and to zero when the variance is greater than the threshold value. The flag is used as further described below to determine whether the modified pixel values will be substituted by the originally recorded and interpolated pixel values of the first step of the method. The filter values are calculated according to the equation:

$$k_1 = \begin{pmatrix} 2 & -1 & -1 \\ -1 & 2 & -1 \\ -1 & -1 & 2 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

$$k_2 = \begin{pmatrix} -1 & 2 & -1 \\ -1 & 2 & -1 \\ -1 & 2 & -1 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

$$k_3 = \begin{pmatrix} -1 & -1 & 2 \\ -1 & 2 & -1 \\ 2 & -1 & -1 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

$$k_4 = \begin{pmatrix} -1 & -1 & -1 \\ 2 & 2 & 2 \\ -1 & -1 & -1 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

and $$std.dev(k) = \frac{1}{N}\sqrt{\sum_{i=1}^{4}(k_i - \bar{k})^2}$$

$$\bar{k} = \frac{1}{4}\sum_{i=1}^{4} k_i$$

The flag $V_s(x_0,y_0)$ is set to one when std.dev(k) is less than 2 and else the flag is set to zero.

Another validation criterion relates to the hue value in the CIELAB color space.

$$a^* = 500\left(\left(\frac{x}{x_N}\right)^{\frac{1}{3}} - \left(\frac{y}{y_N}\right)^{\frac{1}{3}}\right)$$

$$b^* = 200\left(\left(\frac{y}{y_N}\right)^{\frac{1}{3}} - \left(\frac{z}{z_N}\right)^{\frac{1}{3}}\right)$$

$$\begin{pmatrix} x \\ y \\ z \end{pmatrix} = \underline{M}\begin{pmatrix} r \\ g \\ b \end{pmatrix}; \begin{pmatrix} x_N \\ y_N \\ z_N \end{pmatrix} = \underline{M}\begin{pmatrix} 255 \\ 255 \\ 255 \end{pmatrix}$$

$$\underline{M} = \begin{pmatrix} 0{,}431 & 0{,}342 & 0{,}178 \\ 0{,}222 & 0{,}707 & 0{,}071 \\ 0{,}020 & 0{,}130 & 0{,}939 \end{pmatrix}$$

$$MDC_{ab}(x_0, y_0) = \frac{1}{N(x_0, y_0, d)} \sum_{i=1}^{N(x_0,y_0,d)} \Delta C_{ab_i}$$

$$\Delta C_{ab} = \sqrt{(a^*(x_0, y_0) - a^*(x_i, y_i))^2 + (b^*(x_0, y_0) - b^*(x_i, y_i))^2}$$

Then for a square centered around the selected pixel with a side equal to 13 the standard deviation of $MDC_{ab}$ is calculated:

$$VarMak(x_0,y_0) = std.dev(MDC_{ab}(x_i,y_i))$$

and correspondingly for a square with a side length of 4:

$$VarMik(x_0,y_0) = std.dev(MDC_{ab}(x_i,y_i))$$

Then a threshold value is calculated:

$$t(x, y) = t\frac{VarMak(x, y)}{VarMik(x, y)}.$$

It is presently preferred that t is equal to 4.6. Finally a flag $V_c(x_0,y_0)$ is set according to the following:

$V_c(x,y)=1$ when $VarMak(x,y)<t(x,y)$ $V_c(x,y)=0$ otherwise.

Finally the flags are combined so that:

$V(x_0,y_0)=1$ when $V_c(x_0,y_0)=1$ and $V_s(x_0,y_0)=1$;

$V(x_0,y_0)=0$ otherwise.

For pixels with a flag value $V(x_0,y_0)$ equal to 1, the modified pixel values remain unchanged, while for pixels with a flag value equal to zero, the modified pixel component values are substituted with the originally recorded and interpolated values.

Along boundaries between regions of pixels with modified pixel values and pixels with recorded and interpolated values, a smoothing filter may be applied eliminating an abrupt change from modified pixel values $\bar{r}_m$, $\bar{b}_m$ to unmodified pixel values r, b across the boundary:

$\bar{r}_{final}(x,y)=\alpha\bar{r}_m(x,y)+(1-\alpha)r(x,y)$ $\bar{b}_{final}(x,y)=\alpha\bar{b}_m(x,y)+(1-\alpha)r(x,y)$ $$\alpha = \frac{N_{do}}{N_{do} + N_{don't}}$$

wherein $N_{do}$ is the number of pixels within the smoothing window with modified pixel values and $N_{don't}$ is the number of pixels within the smoothing window with unmodified pixel values.

An interpolation strategy and an interpolation algorithm according to a preferred embodiment of the present invention will now be described.

It is noted that the Bayer filter mosaic has twice as many green filters as blue and red filters, hence the name Bayer 2G.

The part of the visual wavelengths sampled by the CCD elements with green filters represents most of the luminance information. The CCD elements with blue and red filters, respectively, sample most of the chrominance information, but the fact that the Blue and Red pixels also carry a lot of pure luminance information is crucial for the interpolation method of the present invention.

In the present invention the missing Green information at pixels covered with Red filter material is solely based on the variation between values from a selected set of Green and Red pixels taken from the surrounding area. The set of values from pixels must be segmented in such a way that it is possible to distinguish between edge boundaries.

Selection of sets of pixels to be considered for possible interpolation depends mostly on the actual layout of the color filter array in question. The number and the choice of set of pixels have profound impact on the performance of the method.

In the case of the Bayer 2G pattern a set of pixels for estimating the Green samples at Red pixels could be as shown in FIG. 4.

The same principle can be applied when selecting the set of pixels for estimating the Green samples at Blue pixels. Again, the set of pixels that are chosen for each set of pixels is critical for the correctness of the estimation.

Referring to FIG. 4, the 4 sets of pixels appears to be sufficient for detection of very fine details still without introducing too much noise and other artifacts in low detail areas of the image.

A variation value, corr, is calculated for each set of pixels. The variation function expresses to which extend the information reduced from one color at a given site can be used to estimate the influence of the same color at a different site, i.e. to reduce the influence of the Green color at e.g. the photo site of a Red filter.

Due to performance constraints the variation formula must be kept as simple as possible still without sacrificing the quality of the output. The formula can be expressed using classic linear correlation.

The formula used in a preferred embodiment of the present invention is given by:

$$\text{mean} := \sum_{n=1}^{m} \frac{G_n}{R_n} \cdot \frac{1}{m}$$

$$\text{corr} := \sum_{n=1}^{m} \left| \frac{G_n}{R_n} - \text{mean} \right|$$

Where G is the green pixels in the set of pixels, R is the red pixels in the set of pixels, m is the number of pixels in each set of pixels, mean is the average ratio between red and green pixels and corr is the variations between red and green pixels. Lower values represent higher correlation.

When a variation value has been calculated for every set of pixels, the set of pixels with the highest correlation (lowest numeric value) is selected. This variation value will be used in the further estimation process.

The missing color at a given photo site is expressed in terms of the information contained in the selected set of pixels. If the variation is below a certain threshold, due to noise or other factors, an alternative set of pixels using a different variation method may be selected.

The missing color is estimated as a weighted sum of the green samples divided by the weighted sum of the red samples multiplied by the sampled value from the photo site to be estimated. This may be expressed in the following way:

$$Rw := \sum_{n=1}^{m} R_n \cdot w_n$$

$$Gw := \sum_{n=1}^{m} G_n \cdot w_n$$

$$Re := R_k \cdot \frac{Gw}{Rw}$$

where Rw is the weighted sum of Red samples in the set of pixels, Gw is the weighted sum of Green samples in the set of pixels, Rk is the sampled value from the photo site in question and Ge is the estimated Green value.

In order to process the full image the above-mentioned process is repeated for each pixel in the image until all the missing colors have been estimated.

FIG. 5 shows a color image that has been interpolated according to the method described above. In the left column of FIG. 5, the interpolated color image is shown together with a grey level image of each of the color channels. In the right column of FIG. 5, the same image is shown after color Moiré suppression by a method according to the present invention. It should be noted that the Moiré in the red and blue channels is reduced significantly.

FIG. 6 is a schematic block diagram showing an electronic camera according to the present invention, in which an area CCD 1 converts a image of an object into an analog color signal. The CCD 1 is controlled by a driving circuit 2, e.g. for starting of the integration (exposure) period, shifting out of the accumulated charges, etc. The analog: output signal from the CCD sensor 1 is routed to an analog amplifier 3 that converts the output signal to a signal compatible with the analog to digital converter 4. The digital output values from the A/D converter 4 represent a digitized version of the recorded image. They are routed to a signal processor 5 that transfers the digital values, with or without modifications, received from the A/D converter to an image storage 6 and finally the image is transferred to a computer (not shown) through the interface 7.

The signal processor 5 is adapted to perform a method according to the present invention.

In another embodiment of the present invention, an image as recorded by the CCD 1 is stored in the memory 6 for transmission through the interface 7 to an external computer that is adapted to perform a method according to the present invention.

An application program for a signal processor 5 of an image processing apparatus adapting the processor 5 to perform the required functions for elimination of color Moiré according to the present invention may reside in the apparatus 10, or it may reside in an external computer. However, the application program may also be segmented into separate executable and resource portions each of which may reside in the apparatus or elsewhere.

What is claimed is:

1. A digital image processing method of eliminating Moiré in a pixilated digital image wherein each pixel is associated with at least a first pixel component value and a second pixel component value of different type, the method comprising:
   selecting a pixel;
   defining a pixel window around the selected pixel;
   identifying a set of pixels consisting of pixels within the pixel window having a first pixel component value within a range that is related to the first pixel component value of the selected pixel;
   calculating a new second pixel component value for the selected pixel using corresponding second pixel component values of pixels in the set of pixels; and
   allocating the calculated new second pixel component value to the selected pixel.

2. A method according to claim 1, wherein said calculating comprises calculating a weighted average of second pixel component values of pixels in the set of pixels.

3. A method according to claim 2, wherein weights of the weighted average are identical to one.

4. A method according to claim 2, further comprising calculating hue values for a selected pixel $(x_0,y_0)$ in the CIELAB color space:

$$a^* = 500\left(\left(\frac{x}{x_N}\right)^{\frac{1}{3}} - \left(\frac{y}{y_N}\right)^{\frac{1}{3}}\right)$$

$$b^* = 200\left(\left(\frac{y}{y_N}\right)^{\frac{1}{3}} - \left(\frac{z}{z_N}\right)^{\frac{1}{3}}\right)$$

$$\begin{pmatrix}x\\y\\z\end{pmatrix} = \underline{M}\begin{pmatrix}r\\g\\b\end{pmatrix}; \begin{pmatrix}x_N\\y_N\\z_N\end{pmatrix} = \underline{M}\begin{pmatrix}255\\255\\255\end{pmatrix}$$

$$\underline{M} = \begin{pmatrix}0,431 & 0,342 & 0,178\\0,222 & 0,707 & 0,071\\0,020 & 0,130 & 0,939\end{pmatrix}$$

and for a macro square centered around the selected pixel with a first side length, calculating:

$$VarMak(x_0,y_0) = std.dev(MDC_{ab}(x_i,y_i))$$

and for a micro square centered around the selected pixel with a second side length, calculating:

$$VarMik(x_0,y_0) = std.dev(MDC_{ab}(x_i,y_i)),$$

wherein:

$$MDC_{ab}(x_0, y_0) = \frac{1}{N(x_0, y_0, d)} \sum_{i=1}^{N(x_0,y_0,d)} \Delta C_{ab_i}$$

$$\Delta C_{ab} = \sqrt{(a^*(x_0,y_0)-a(x_i,y_i))^2+(b^*(x_0,y_0)-b^*(x_i,y_i))^2}$$

and calculating a threshold value:

$$t(x, y) = t\frac{VarMak(x, y)}{VarMik(x, y)},$$

and setting a flag $V_c(x_0,y_0)$ is set according to the following:

$V_c(x,y)=1$ when $VarMak(x,y)<t(x,y)$ $V_c(x,y)=0$ otherwise.

5. A method according to claim 4, further comprising substituting red and blue pixel component values of the selected pixel $(x_0,y_0)$ with originally or interpolated pixel component values when the flag $V_c(x_0,y_0)$ is equal to zero.

6. A method according to claim 4, wherein the first side length is 13, the second side length is 4, and t is 4.6.

7. A method according to claim 4, further comprising:
for a selected pixel $(x_0,y_0)$ calculating $$k_1 = \begin{pmatrix}2 & -1 & -1\\-1 & 2 & -1\\-1 & -1 & 2\end{pmatrix} * \begin{pmatrix}g(x_{-1},y_{-1}) & g(x_0,y_{-1}) & g(x_1,y_{-1})\\g(x_{-1},y_0) & g(x_0,y_0) & g(x_1,y_0)\\g(x_{-1},y_1) & g(x_0,y_1) & g(x_1,y_1)\end{pmatrix}$$

$$k_2 = \begin{pmatrix}-1 & 2 & -1\\-1 & 2 & -1\\-1 & 2 & -1\end{pmatrix} * \begin{pmatrix}g(x_{-1},y_{-1}) & g(x_0,y_{-1}) & g(x_1,y_{-1})\\g(x_{-1},y_0) & g(x_0,y_0) & g(x_1,y_0)\\g(x_{-1},y_1) & g(x_0,y_1) & g(x_1,y_1)\end{pmatrix}$$

-continued $$k_3 = \begin{pmatrix} -1 & -1 & 2 \\ -1 & 2 & -1 \\ 2 & -1 & -1 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

$$k_4 = \begin{pmatrix} -1 & -1 & -1 \\ 2 & 2 & 2 \\ -1 & -1 & -1 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

and $$std.dev(k) = \frac{1}{N}\sqrt{\sum_{i=1}^{4}(k_i - \bar{k})^2}$$

$$\bar{k} = \frac{1}{4}\sum_{i=1}^{4}k_i$$

and setting a flag $V_s(x_0, y_0)$ to one when std.dev(k) is less than 2 and otherwise setting the flag $V_s(x_0, y_0)$ to zero;

substituting red and blue pixel component values of the selected pixel $(x_0, y_0)$ with originally or interpolated pixel component values when the flag $V_s(x_0, y_0)$ is equal to zero; and combining the flags $V_s(x_0, y_0)$ and $V_c(x_0, y_0)$ into a flag $V(x_0, y_0)$ so that:

$V(x_0, y_0) = 1$ when $V_c(x_0, y_0) = 1$ and $V_s(x_0, y_0) = 1$;

$V(x_0, y_0) = 0$ otherwise, and substituting red and blue pixel component values of the selected pixel $(x_0, y_0)$ with the originally or interpolated pixel component values when the flag $V(x_0, y_0)$ is equal to zero.

8. A method according to claim 1, wherein the pixel window is centered around the selected pixel.

9. A method according to claim 1, wherein the pixel window is a rectangle.

10. A method according to claim 9, wherein the pixel window is a square.

11. A method according to claim 1, further comprising:

for a selected pixel $(x_0, y_0)$ calculating $$k_1 = \begin{pmatrix} 2 & -1 & -1 \\ -1 & 2 & -1 \\ -1 & -1 & 2 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

$$k_2 = \begin{pmatrix} -1 & 2 & -1 \\ -1 & 2 & -1 \\ -1 & 2 & -1 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

$$k_3 = \begin{pmatrix} -1 & -1 & 2 \\ -1 & 2 & -1 \\ 2 & -1 & -1 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

$$k_4 = \begin{pmatrix} -1 & -1 & -1 \\ 2 & 2 & 2 \\ -1 & -1 & -1 \end{pmatrix} * \begin{pmatrix} g(x_{-1}, y_{-1}) & g(x_0, y_{-1}) & g(x_1, y_{-1}) \\ g(x_{-1}, y_0) & g(x_0, y_0) & g(x_1, y_0) \\ g(x_{-1}, y_1) & g(x_0, y_1) & g(x_1, y_1) \end{pmatrix}$$

and

-continued $$std.dev(k) = \frac{1}{N}\sqrt{\sum_{i=1}^{4}(k_i - \bar{k})^2}$$

$$\bar{k} = \frac{1}{4}\sum_{i=1}^{4}k_i$$

and setting a flag $V_s(x_0, y_0)$ to one when std.dev(k) is less than 2 and otherwise setting the flag to zero.

12. A method according to claim 11, further comprising substituting red and blue pixel component values of the selected pixel $(x_0, y_0)$ with originally or interpolated pixel component values when the flag $V_s(x_0, y_0)$ is equal to zero.

13. A method according to claim 1, further comprising applying a smoothing filter along boundaries between regions of pixels with modified pixel values and pixels with recorded and interpolated values for elimination of an abrupt change from modified pixel values $\bar{r}_m$, $\bar{b}_m$ to un-modified pixel values r, b across a boundary:

$$\bar{r}_{final}(x,y) = \alpha\bar{r}_m(x,y) + (1-\alpha)r(x,y)$$

$$\bar{b}_{final}(x,y) = \alpha\bar{b}_m(x,y) + (1-\alpha)b(x,y)$$

$$\alpha = \frac{N_{do}}{N_{do} + N_{don't}}$$

wherein $N_{do}$ is a number of pixels within a smoothing window with modified pixel values and $N_{don't}$ is a number of pixels within the smoothing window with un-modified pixel values.

14. A method according to claim 1, further comprising:

selecting a second pixel; and interpolating a color (A) value of the selected second pixel by calculating the color (A) value from color values of a selected set of pixels that are positioned adjacent to the selected second pixel, the influence of at least one pixel abutting the selected second pixel being significantly reduced whereby blurring of distinct features of the digital image is substantially avoided.

15. A method according to claim 14, further comprising:

forming a first set of pixels that are positioned adjacent to the selected second pixel;

calculating a first variation value of color values of the pixels of the first set of pixels;

forming a second set of pixels that are positioned adjacent to the selected second pixel;

calculating a second variation value of color values of the pixels of the second set;

comparing the first and second variation values; and calculating the color (A) value from color values of the set of pixels with the lowest variation value.

16. A method according to claim 15, wherein color (B) values of the set of pixels with the lowest variation value are included in the calculation of the color (A) value.

17. A method according to claim 15, wherein color (B) values are included in the calculation of variation values of the first and second set of pixels, respectively.

18. A method according to claim 17, wherein each of said calculating variation values of the first and second set of pixels, respectively, comprises:

calculating the ratio between color (A) values and color (B) values of abutting pixels of the respective set of pixels;

calculating a mean value of the calculated ratios; and calculating the variation value of the respective set of pixels as a sum of an absolute value of a difference between each of the ratios and the mean value.

19. A method according to claim 15, wherein said calculating the color (A) value comprises:

calculating a weighted sum of color (B) values of the set of pixels with the lowest variation value;

calculating a weighted sum of color (A) values of the set of pixels with the lowest variation value; and calculating the color (A) by multiplying a color (B) value of the selected second pixel with a ratio between the weighted sums of color (A) and color (B) values.

20. A method according to claim 14, wherein the color (A) value is calculated form an arbitrary number of colors.

21. A method according to claim 14, wherein the selected set of pixels comprises a plural number of selected sets of pixels.

22. A method according to claim 21, wherein the selected sets of pixels are arranged in rows and columns parallel to rows and columns of the pixels in the image.

23. A method according to claim 21, wherein the selected sets of pixels are arranged in rows at an angle of approximately 45 degrees relative to rows and columns of the pixels in the image.

24. A method according to claim 21, wherein the selected sets of pixels are arranged in rows at an angle of approximately 45 degrees relative to rows and columns of the pixels in the image and in rows and columns parallel to the rows and columns of the pixels in the image.

25. A method according to claim 21, wherein the selected sets of pixels are arranged in rows at an arbitrary angle relative to rows and columns of the pixels in the image.

26. A method according to claim 21, wherein the number of selected sets of pixels is 4.

27. An image processing apparatus with a processor that is adapted for performing a method according to claim 1.

28. An image recording system with a processor that is adapted for performing a method according to claim 1.

29. A software program residing in a computer readable medium for performing a method according to claim 1.

30. A data carrier residing in a computer readable medium for performing a method according to claim 1.

* * * * *